United States Patent Office 2,949,463
Patented Aug. 16, 1960

2,949,463

CERTAIN 1,3-DIPHENYL-2-THIOPARABANIC ACIDS

Renat Herbert Mizzoni, Long Valley, N.J., assignor to Ciba Pharmaceutical Products, Inc., Summit, N.J., a corporation of New Jersey No Drawing. Filed Jan. 26, 1959, Ser. No. 788,759

9 Claims. (Cl. 260—240)

This invention relates to a new series of 2-thioparabanic acid derivatives. More particularly, it concerns 1,3-diphenyl-2-thioparabanic acids, in which one of the phenyl radicals contains in the 4-position a group of the formula Py—[C(R)=CH]$_n$—, in which Py stands for a pyridyl group, R stands for hydrogen, lower alkyl or monocyclic carbocyclic aryl, and n stands for a whole number from 0 to 2, and the other phenyl radical contains in the 4-position an N,N-di-lower alkyl-amino-lower alkoxy group or, particularly, an alkoxy group having from 4 to 5 carbon atoms, and the salts thereof, as well as process for the preparation thereof.

A pyridyl radical stands for 3-pyridyl, 4-pyridyl or, especially, 2-pyridyl radicals, which may contain as additional substituents lower alkyl, e.g. methyl or ethyl; nitro or amino groups, or halogen, e.g. chlorine or bromine, atoms. R represents primarily hydrogen; it may also stand for lower alkyl, e.g. methyl or ethyl. Furthermore, a monocyclic carbocyclic aryl radical, e.g. phenyl or phenyl substituted, for example, by halogen, e.g. chlorine or bromine, or lower alkoxy, e.g. methoxy or ethoxy, may be anticipated as the radical R.

An N,N-di-lower alkyl-amino-lower alkoxy group is represented by 2-dimethylaminoethoxy or 2-diethylaminoethoxy. An alkoxy group having from 4 to 5 carbon atoms stands for n-butyloxy, isobutyloxy, secondary butyloxy, n-pentyloxy or isopentyloxy.

Salts of the new 2-thioparabanic acid derivatives are therapeutically acceptable acid addition salts, for example, those with inorganic acids, such as hydrohalic acids, e.g. hydrochloric or hydrobromic acid; sulfuric or phosphoric acids; or those with organic acids, such as acetic, propionic, glycolic, lactic, oxalic, malonic, succinic, maleic, fumaric, malic, tartaric, citric, hydroxymaleic, dihydroxymaleic, benzoic, salicylic, 4-aminosalicylic, methane sulfonic, ethane sulfonic or hydroxyethane sulfonic acid.

It has been found that the new compounds of this invention and the salts thereof inhibit the growth of different types of Mycobacteria, such as *Mycobacterium tuberculosis*, e.g. the human pathogenic strain H 37 Rv of *Mycobacterium tuberculosis*, or *Mycobacterium leprae*, and may therefore be used as tuberculostatic and leprostatic agents. For example, a good tuberculostatic effect is obtained with 1,3-diphenyl-2-thioparabanic acids, in which one of the phenyl radicals contains in the 4-position an alkoxy group having from 4 to 5 carbon atoms, and the other phenyl radical contains in the 4-position a 2-pyridyl or a 2-(2-pyridyl)-ethenyl group.

The new compounds of this invention may be used as tuberculostatic or leprostatic agents in the form of pharmaceutical preparations, which contain the new compounds or salts thereof in admixture with a pharmaceutical organic or inorganic, solid or liquid carrier suitable for enteral e.g. oral, or parenteral administration. For making up the preparations there can be employed substances which do not react with the new compounds, such as water, gelatine, lactose, starches, stearic acid, magnesium stearate, stearyl alcohol, talc, vegetable oils, benzyl alcohols, gums, waxes, propylene glycol, polyalkylene glycols, petroleum jelly or any other known carrier for medicaments. The pharmaceutical preparations may be in solid form, for example, as tablets, dragees or capsules, or in liquid form, for example, as solutions or emulsions. If desired, they may contain auxiliary substances, such as preserving agents, stabilizing agents, wetting or emulsifying agents, salts for varying the osmotic pressure or buffers. They may also contain, in combination, other therapeutically useful substances, particularly other antitubercular agents, such as, for example, 4-aminosalicylic acid, isonicotinic acid hydrazide, streptomycin or dihydrostreptomycin, or antileprotic agents, for example, sulfones, e.g. thiazolsulfone.

The new 2-thioparabanic acid derivatives of this invention may be prepared by treating a 1,3-diphenyl-2-thiourea, in which one of the phenyl radicals contains in the 4-position a group of the formula Py—[C(R)=CH]$_n$— in which Py, R and n have the above-given meaning, and the other phenyl group contains in the 4-position, an N,N-di-lower alkyl-amino-lower alkoxy group or an alkoxy group having from 4 to 5 carbon atoms, with oxalic acid, preferably in the form of a reactive functional derivative thereof, and, if desired, converting a resulting salt into the free base, and/or, if desired, converting resulting base into the salt thereof.

Functional derivatives of oxalic acid, which are capable of reacting with a 2-thiourea compound to form the desired 2-thioparabanic acid derivatives, are especially oxalyl halides, primarily oxalyl chloride. These reagents are preferably used in the presence of a non-hydroxylated solvent, such as, hydrocarbons, e.g. hexane, benzene or toluene; ethers, e.g. dioxane or 1,2-dimethoxy-ethane; or halogenated hydrocarbons, e.g. methylene chloride, chloroform, carbon tetrachloride or ethylene chloride. Another functional derivative of oxalic acid to be used in the above reaction is cyanogen. A solution, preferably a lower alkanol, e.g. methanol, ethanol or propanol, solution of the 2-thiourea compound is treated with the gaseous cyanogen and the resulting reaction product is then hydrolyzed, preferably with an aqueous inorganic acid, e.g. hydrochloric, hydrobromic or sulfuric acid, to form the desired 2-thioparabanic acid compound.

The 1,3-diphenyl-2-thioureas used as the starting materials are known or may be prepared according to methods generally employed for the preparation of thioureas. Thus, a 1,3-diphenyl-2-thiourea may be prepared by reacting an appropriately substituted phenylisothiocyanate with a substituted aniline; for example, 4-isopentyloxy-phenylisothiocyanate may be reacted with 4-(2-pyridyl)-aniline or 4-[2-(2-pyridyl)-ethenyl]-aniline to form the 1-(4-isopentyloxy-phenyl)-3-[4-(2-pyridyl)-phenyl]-2-thiourea and 1-(4-isopentyloxy-phenyl)-3-{4-[2-(2-pyridyl)-ethenyl]-phenyl}-2-thiourea, respectively. These thioureas may also be used in the form of their acid addition salts.

Depending on the conditions used, the new compounds may be obtained in the form of the free bases or salts thereof. A salt may be converted into the free base in the customary way, for example, by treatment with an aqueous alkaline medium, such as an alkali metal hydroxide, e.g. sodium carbonate or potassium hydrogen carbonate; or ammonia. A free base may be transformed into its therapeutically acceptable acid addition salts by reaction with appropriate inorganic or organic acids, such as those outlined above, for example, in a lower alkanol, e.g. methanol, ethanol, propanol or isopropanol, solution. A reaction product may also be obtained in the form of a hydrate; mono- or poly-salts may be formed.

This is a continuation-in-part application of my application Serial No. 776,750, filed November 28, 1958 (now abandoned), which in turn is a continuation-in-part application of my application Serial No. 714,963, filed February 13, 1958 (now abandoned).

The following examples are intended to illustrate the invention, and are not to be construed as being limitations thereon. Temperatures are given in degrees centigrade.

*Example 1*

A solution of 3.78 g. of 1-(4-isobutyloxy-phenyl)-3-[4-(2-pyridyl)-phenyl]-2-thiourea in 25 ml. of chloroform is heated on the steam bath while stirring and 1.30 g. of oxalyl chloride in 10 ml. of chloroform is added over a period of five minutes. After refluxing for ¾ hour and cooling, a precipitate is formed which is filtered off, washed with chloroform and recrystallized from a mixture of isopropanol and ether to yield the 1-(4-isobutyloxy - phenyl) - 3 - [4 - (2 - pyridyl) - phenyl] - 2 - thioparabanic acid hydrochloride, M.P. 259°; yield: 2.95 g.

*Example 2*

The reaction of 12 g. of 1-(4-isopentyloxy-phenyl)-3-[4-(2-pyridyl)-phenyl]-2-thiourea with 4.3 g. of oxalyl chloride in 300 ml. of chloroform according to the procedure given in Example 1, yields 10 g. of 1-(4-isopentyloxy - phenyl) - 3 - [4 - (2 - pyridyl) - phenyl] - 2 - thioparabanic acid hydrochloride, M.P. 213°.

The starting material used in the above reaction may be prepared as follows: A solution of 3.4 g. of 4-(2-pyridyl)-aniline and 4.4 g. of 4-isopentyloxy-phenylisothiocyanate in 15 ml. of methanol is refluxed for fifteen minutes. The white precipitate, formed upon chilling, is filtered off and washed with ether. A second crop of crystalline material is obtained by diluting the filtrate with ether. The combined crops are dissolved in chloroform, the solution filtered through silicic acid and the filtrate diluted with pentane. The crystalline 1-(4-isopentyloxy-phenyl) - 3 - [4-(2-pyridyl)-phenyl]-2-thiourea is filtered off, washed with pentane and dried, M.P. 128–128.5°; yield: 2.9 g.

*Example 3*

The 1 - (4 - n-butyloxy-phenyl)-3-[4-(3-pyridyl)-phenyl]-2-thioparabanic acid hydrochloride may be obtained by reacting 37.8 g. of 1-(4-n-butyloxy-phenyl)-3-[4-(3-pyridyl)-phenyl]-2-thiourea with 12.8 g. of oxalyl chloride according to the procedure disclosed in Example 1.

*Example 4*

A solution of 16.9 g. of 1-(4-n-butyloxy-phenyl)-3-{4-[2-(2-pyridyl)-ethenyl]-phenyl}-2-thiourea in 200 ml. of chloroform is heated to reflux and 5.7 g. of oxalyl chloride in 20 ml. of chloroform is added over a period of five minutes while stirring. After refluxing for two hours and cooling, a precipitate is formed which is filtered off and recrystallized from a mixture of methanol and water to yield the 1-(4-n-butyloxy-phenyl)-3-{4-[2-(2-pyridyl)-ethenyl]-phenyl}-2-thioparabanic acid, M.P. 232–233.5°.

The hydrochloride is prepared by treating the base in ethanol with hydrogen chloride and precipitating the salt by adding ether.

The starting material may be prepared as follows: A mixture of 7.9 g. of 4-[2-(2-pyridyl)-ethenyl]-aniline and 10.4 g. of 4-n-butyloxy-phenylisothiocyanate in 120 ml. of methanol is refluxed on the steam bath. A yellow precipitate forms after 5 minutes, and the reaction mixture is cooled after an additional two hours of refluxing. The solid material is filtered off and the 1-(4-n-butyloxy-phenyl) - 3 - {4 - [2 - (2 - pyridyl) - ethenyl - phenyl} - 2-thiourea hemihydrate is recrystallized from anhydrous ethanol, M.P. 168–169°; yield: 10.0 g.

*Example 5*

8 g. of 1-(4-isopentyloxy-phenyl)-3-{4-[2-(2-pyridyl)-ethenyl]-phenyl}-2-thiourea is dissolved in 100 ml. of warm chloroform and 2.5 g. of oxalyl chloride in 100 ml. of chloroform is added while stirring and refluxing. After two hours the yellow solution is cooled to yield a yellow solid, which is filtered off. The 1-(4-isopentyloxy - phenyl) - 3 - {4 - [2 - (2 - pyridyl) - ethenyl - phenyl}-2-thioparabanic acid is recrystallized from a mixture of methanol and water, M.P. 242–243°.

The starting material may be prepared as follows: A solution of 7.9 g. of 4-[2-(2-pyridyl)-ethenyl]-aniline and 8.9 g. of 4-isopentyloxy-phenylisothiocyanate in a mixture of 20 ml. of methanol and 50 ml. of ethanol is refluxed on the steam bath for 3½ hours. The white precipitate, formed upon chilling, is filtered off and recrystallized from a mixture of isopropanol and ethanol to yield 6 g. of 1-(4-isopentyloxy-phenyl)-3-{4-[2-(2-pyridyl)-ethenyl]-phenyl}-2-thiourea, M.P. 143.5–146°.

*Example 6*

The 1 - (4 - isobutyloxy - phenyl) - 3-{4-[2-(2-pyridyl)-ethenyl]-phenyl}-2-thioparabanic acid hydrochloride may be obtained by reacting 16.9 g. of 1 - (4 - isobutyloxy-phenyl) - 3 - {4 - [2 - (2 - pyridyl) - ethenyl - phenyl} - 2-thiourea with 5.7 g. of oxalyl chloride according to the procedure disclosed in Example 4.

The starting material may be prepared as follows: 7.9 g. of 4-[2-(2-pyridyl)-ethenyl]-aniline is dissolved in a mixture of 120 ml. of methanol and 75 ml. of ethanol, 10.5 g. of 4-isobutyloxy-phenylisothiocyanate is added to the warm solution, and the mixture is refluxed for three hours on the steam bath. The solution is concentrated to one-third of its original volume, the precipitate is filtered off after chilling and is washed with isopropanol. The resulting 1-(4-isobutyloxy-phenyl)-3-{4-[2-(2-pyridyl)-ethenyl]-phenyl}-2-thiourea is recrystallized from aqueous methanol, M.P. 139°.

By reacting 4-(2-diethylaminoethoxy)-phenylisothiocyanate with 4-[2-(4-pyridyl)-ethenyl]-aniline and treating the resulting 1-[4-(2-diethylaminoethoxy)-phenyl]-3-{4-[2-(4-pyridyl)-ethenyl]-phenyl}-2-thiourea with oxalyl chloride according to the procedure of Example 4 the 1 - [4 - (2 - diethylaminoethoxy) - phenyl] - 3 - {4 - [2-(4-pyridyl)-ethenyl]-phenyl}-2-thioparabanic acid hydrochloride can be obtained. The reaction of oxalyl chloride with 1-{4-[4-(2-pyridyl)-butadienyl]-phenyl}-3-(4-n-butyloxy-phenyl)-2-thiourea, prepared from 4-[4-(2-pyridyl)-butadienyl]-aniline and 4-n-butyloxy-phenylisothiocyanate, yields the 1-{4-[4-(2-pyridyl)-butadienyl]-phenyl}-3-(4-n-butyloxy-phenyl)-2-thioparabanic acid in the form of its hydrochloride.

*Example 7*

Upon treatment of 1-(4-isopentyloxy-phenyl)-3-{4-[2-methyl - 2 - (2-pyridyl)-ethenyl]-phenyl}-2-thiourea with oxalyl chloride according to the previously-outlined procedure the 1-(4-isopentyloxy-phenyl)-3-{4-[2-methyl-2-(2-pyridyl)-ethenyl]-phenyl}-2-thioparabanic acid hydrochloride can be formed.

The starting material used in the above reaction may be prepared as follows: A mixture of 53.5 g. of 2-ethylpyridine, 75.6 g. of p-nitrobenzaldehyde and 52 g. of acetic acid anhydride is refluxed for seven hours. The cold mixture is poured into dilute aqueous hydrochloric acid, and made slightly basic with aqueous ammonia while stirring. The yellow 4 - [2 - methyl-2-(2-pyridyl)-ethenyl]-nitrobenzene is filtered off, washed, air dried and recrystallized from 95 percent ethanol, M.P. 98–100.5°; yield: 84 percent.

To a solution of 343 g. of stannous chloride in 535 ml. of concentrated aqueous hydrochloric acid is added 101 g. of 4-[2-methyl-2-(2-pyridyl)-ethenyl]-nitrobenzene; a light colored paste is formed and heating is continued for one and one-half hours. The mixture is chilled, filtered, the solid material is washed and added to concentrated aqueous hydrochloric acid. The resulting suspension is poured into aqueous sodium hydroxide, so that the final pH=10-11, and the precipitate is filtered off, washed thoroughly with water and dried on the funnel. The solid material is extracted with ethanol in a Soxhlet apparatus, the solvent is evaporated and the light tan-colored 4-[2-methyl-2-(2-pyridyl)-ethenyl]-aniline is recrystallized from isopropanol, M.P. 118.5°; yield: 43 g.

A solution of 11.1 g. of 4-isopentyloxy-phenylisothiocyanate and 10.5 g. of 4-[2-methyl-2-(2-pyridyl)-ethenyl]-aniline in 100 ml. of anhydrous ethanol is refluxed for three hours, then filtered hot and the filtrate is chilled. The resulting 1-(4-isopentyloxy-phenyl)-3-{4-[2-methyl-2-(2-pyridyl)-ethenyl]-phenyl}-2-thiourea is filtered off, washed with a 1:1-mixture of ethanol and petroleum ether and recrystallized from isopropanol, M.P. 124.5-125.5°; yield: 15 g.

*Example 8*

The 1 - (4 - isobutyloxy - phenyl) - 3 - {4 - [2 - methyl - 2 - (2 - pyridyl) - ethenyl] - phenyl} - 2 - thioparabanic acid hydrochloride is prepared by reacting 1-(4 - isobutyloxy - phenyl) - 3 - {4 - [2 - methyl - 2 - (2 - pyridyl) - ethenyl] - phenyl} - 2 - thiourea with oxalyl chloride as described in Example 4.

The starting material may be prepared as follows: A mixture of 10.4 g. of 4-isobutyloxy-phenylisothiocyanate and 10.5 g. of 4-[2-methyl-2-(2-pyridyl)-ethenyl]-aniline in 75 ml. of ethanol is refluxed for three hours. Crystals are formed upon chilling and adding isopropanol; the 1 - (4 - isobutyloxy - phenyl) - 3 - {4 - [2 - methyl-2 - (2 - pyridyl) - ethenyl] - phenyl} - 2 - thiourea is filtered off, washed with isopropanol and then with pentane and recrystallized from isopropanol, M.P. 113-114°; yield: 11 g.

What is claimed is:

1. A member of the group consisting of 1,3-diphenyl-2-thioparabanic acid, in which one of the phenyl radicals is substituted in the 4-position by a member of the group consisting of alkoxy having from 4 to 5 carbon atoms and N,N-di-lower alkyl-amino-lower alkoxy, and the other phenyl radical is substituted in the 4-position by the group of the formula Py—[C(R)=CH]$_n$—, in which Py stands for a member of the group consisting of 2-pyridyl, 3-pyridyl and 4-pyridyl, R for a member of the group consisting of hydrogen and lower alkyl, and $n$ represents a whole number from 0 to 2, and therapeutically useful acid addition salts thereof.

2. 1,3-diphenyl-2-thioparabanic acid, in which one of the phenyl radicals is substituted in the 4-position by alkoxy group having from 4 to 5 carbon atoms and the other phenyl radical is substituted in 4-position by 2-pyridyl.

3. 1 - (4 - isobutyloxy - phenyl) - 3 - [4 - (2-pyridyl)-phenyl]-2-thioparabanic acid.

4. 1 - (4 - isopentyloxy - phenyl) - 3 - [4 - (2 - pyridyl)-phenyl]-2-thioparabanic acid.

5. 1 - (4 - n - butyloxy - phenyl) - 3 - [4 - (3 - pyridyl)-phenyl]-2-thioparabanic acid.

6. 1,3-diphenyl-2-thioparabanic acid, in which one of the phenyl radicals is substituted in the 4-position by alkoxy having from 4 to 5 carbon atoms and the other phenyl radical is substituted in the 4-position by 2-(2-pyridyl)-ethenyl.

7. 1 - (4 - n - butyloxy - phenyl) - 3 - {4 - [2 - (2 - pyridyl)-ethenyl]-phenyl}-2-thioparabanic acid.

8. 1 - (4 - isopentyloxy - phenyl) - 3 - {4 - [2 - (2 - pyridyl)-ethenyl]-phenyl}-2-thioparabanic acid.

9. 1 - (4 - isobutyloxy - phenyl) - 3 - {4 - [2 - (2 - pyridyl)-ethenyl]-phenyl}-2-thioparabanic acid.

References Cited in the file of this patent

Bilz: Berichte Deutsche Chemische Gesellschaft, vol. 46, p. 1404 (1913).

Beilstein: Handbuch Der Organische Chemie, vol. 24, p. 407 (System No. 3614) (1936).